April 19, 1938. M. NIELSON 2,114,933
PLUG VALVE
Filed May 13, 1936
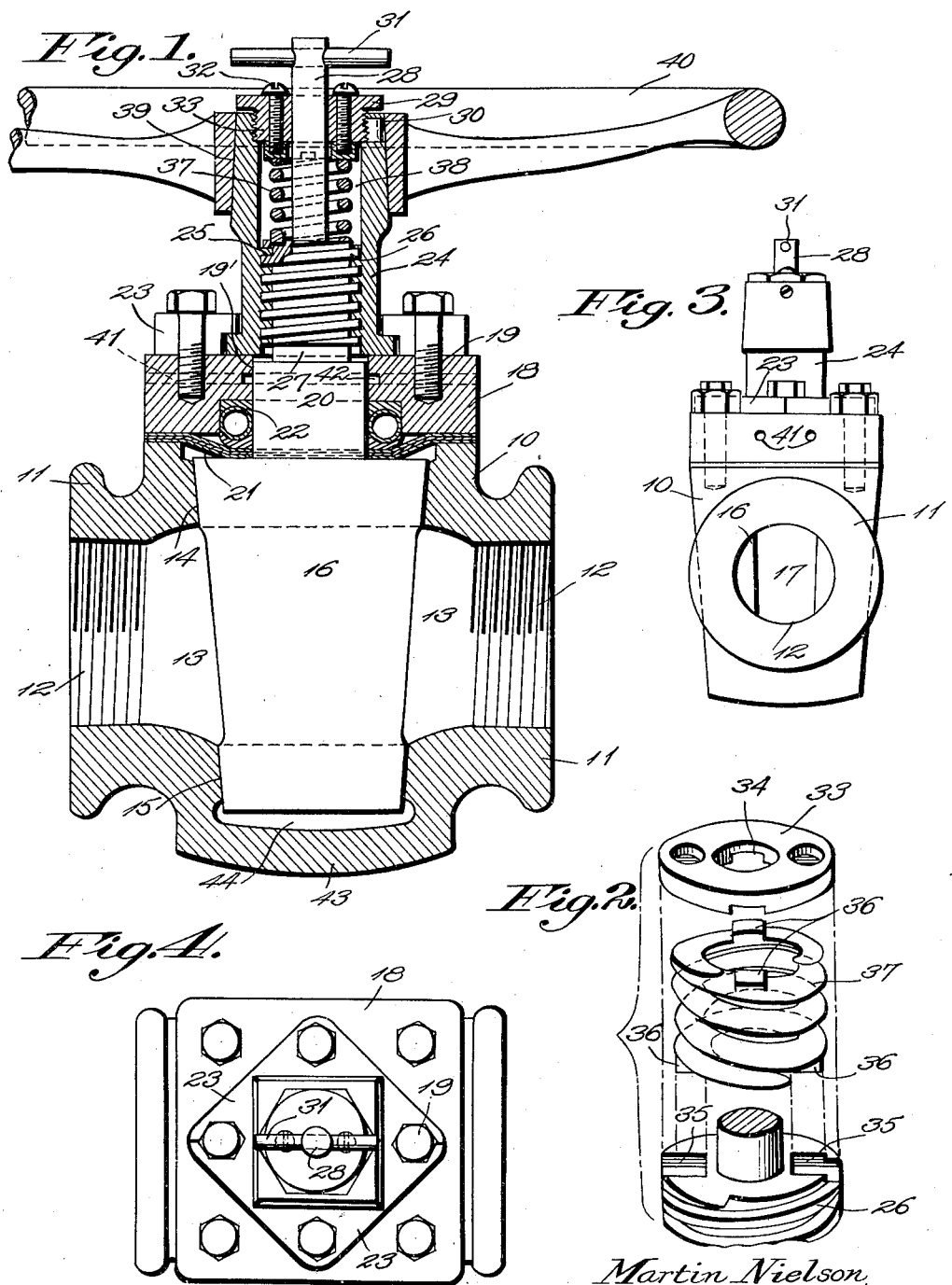
Martin Nielson INVENTOR
BY Victor J. Evans & Co. ATTORNEYS Patented Apr. 19, 1938

2,114,933

UNITED STATES PATENT OFFICE 2,114,933

PLUG VALVE

Martin Nielson, Hartell, Alberta, Canada

Application May 13, 1936, Serial No. 79,570

1 Claim. (Cl. 251—97)

The invention relates to a valve construction and more especially to a plug cock or valve.

The primary object of the invention is the provision of a valve, wherein the valve plug will be seated and to enable the easy operation of the valve such plug will be automatically lifted from its seat to eliminate the sticking of the plug in the opening and closing of the valve.

Another object of the invention is the provision of a valve of this character, wherein the plug is turned in one direction for opening and closing of the same.

A further object of the invention is the provision of a valve of this character, wherein the plug will be prevented from leaking and is readily and easily turned to opened or closed position as the necessity of lubrication of the plug is eliminated because when the valve plug is to be turned it will be automatically lifted from its seat to avoid any sticking thereof.

A still further object of the invention is the provision of a valve of this character, which is comparatively simple in its construction, thoroughly reliable and efficient in its operation, assured of uniform wear at the plug of the same, readily and easily turned for opening and closing movements, strong, durable, and inexpensive to manufacture.

In the accompanying drawing:

Figure 1 is a vertical sectional view through a valve constructed in accordance with the invention.

Figure 2 is an exploded perspective view showing the tensioning spring and adjuncts for the turning of the valve plug.

Figure 3 is an end elevation of the valve.

Figure 4 is a top plan view.

Similar reference characters indicate corresponding parts throughout the several views in the drawing.

Referring to the drawing in detail, the valve comprises a shell or body 10 which can be formed by casting in the well known manner or be formed by forging, pressing or stamping operations. Preferably the body is of rectangular shape although it may be otherwise shaped. At opposite sides of the body are circular flanges 11 having internally threaded apertures 12 opening into a central machine tapered compartment or chamber 13 provided with accurately machined or ground seats 14 and 15, respectively, which are adapted to engage the rotatable plug or cock member 16 formed with the central way 17. On the turning of the plug or cock member 16 the way 17 is opened or closed and when opened is in alignment with the apertures 12 for the flow of fluid through said plug or cock member. The chamber or compartment 13 opens through the upper side of the shell or body 10 and is closed by a cover plate 18 bolted at 19 in place upon said body. This cover plate has a central opening 19' for the inner enlarged circular portion 20 of a stem extending upwardly centrally from the plug or cock member 16.

Held between the body 10 and plate 18 are packing diaphragms 21 and a packing ring 22, respectively, these being concentrically of the enlarged inner end 20 of the stem for the plug or cock member 16 to assure a fluid tight connection of the plate 18 upon the body 10 and to avoid leakage about the said stem.

Mounted on the plate 18 is a split clamping piece 23 for swiveled connection with the said plate 18 of a turning hub 24 which is provided with internal screw threads 25 engaging external screw threads 26 companion thereto and formed on the stepped portion 27 of the stem 28 which has its outer end freely passed through a cap 29 threaded into the outer end of the hub 24. This cap 29 when threaded home in the hub 24 is held secure by a suitable latch 30. The stem 28 is extended beyond the cap 29 and has fitted therewith a cross pin 31 which is indicative of the position of the plug or cock member 16 when in opened or closed positions.

Secured to the cap 29 by fasteners 32 is a clutch ring 33, it having diametrically opposed notches 34 in its lower face while formed in the stepped portion 27 of the stem 28 are diametrically opposed notches 35, these notches 34 and 35 being adapted to accommodate clutch lugs 36 formed on the outermost coils of a coiled tensioning spring 37 which is confined within a circular space 38 interiorly of the hub 24 between the stepped portion 27 of the stem 28 and the cap 29. This spring functions as a clutch for connecting the stem 28 with a turning hub 24.

The upper end of the hub 24 is externally squared to accommodate a center socket portion 39 of a hand turning wheel 40 which is made secure upon the hub 24 by a wedging connection between the said hub and the center socket portion 39.

Normally the plug or cock member 16 is tight against the seats 14 and 15 in its chamber 13 within the shell or body 10. Now when the hand wheel 40 is turned the spring 37 which is normally under a certain amount of tension when assembled within the valve mechanism will become further tensioned in that when the wheel 40 is turned the hub 24 turns therewith and due to the screw threads internally of the said hub and externally on the stepped portion 27 of the stem 28 the plug or cock member 16 will be automatically lifted from the seats 14 and 15 to eliminate any possibility of the sticking of the plug in the valve casing or shell 10 when the said plug or cock member is to be turned for the opening or closing of such valve. When the wheel 40 is released the augmented tension of the spring 37 will exert action upon the plug or cock member 16 causing it to move to seating position against the seats 14 and 15 to eliminate leakage at these areas, the seating action by the spring 37 is slight as only a small degree of movement is required to bring about the seating of the valve to avoid leakage at the plug or cock member 16 within its shell or body 10.

As has been previously stated, the pin 31 on the stem 28 identifies or indicates the position of the plug or cock member 16 within the shell or body 10, that is to say, whether such valve is opened or closed.

The plug or cock member 16 can not possibly stick to the seats 14 and 15 therefor within the shell or body 10 because the initial turning of the wheel 40 through the screw connection of the hub 24 with the stem 28 effects a lifting of the said plug or cock member 16 from the seats 14 and 15 and on continued turning of the wheel 40 the valve can be opened or closed, this being brought about by the turning of such wheel in one direction only.

Formed in the plate 18 and opening through opposite edges thereof are passages 41, these opening into a cell, groove or channel 42 about the enlarged inner end portion 20 of the stem 28 for the plug or cock member 16, thereby enabling the escape or venting of anything that might pass the packing ring 22, as for example corrosive substance, viscous into and around the elevating device that would cause binding and excessive friction, thus in this manner eliminating the latter.

The bottom end of the chamber 13 is closed by a slot bottom 43 to the shell or body 10 and this bottom has a cavity 44 to space the lower end of the plug or cock member 16 from said bottom to avoid any sticking at that point of such plug or member.

What is claimed is:

In a turn plug valve, a body having a chamber opening upwardly thereof, a plug valve seated in said chamber, a stem extending from the valve and having an enlarged inner end and a threaded outer end, a cover plate on said body for the chamber, packing diaphragms held between the cover plate and the said body for engagement with the valve about the enlarged inner end, a packing ring seated in the cover plate concentrically about the enlarged inner end of the stem and active against the diaphragm, a tubular hub swiveled on the cover plate and having internal screw threads engaging the threaded outer end of the stem, a clutch ring separably fastened in the outer end of the hub and having notches at its innermost side, the said threaded outer end of the stem being formed with notches, and a coiled tensioning spring between the clutch ring and the outer threaded end of the stem and having clutch lugs accommodated in the notches in the ring and threaded end of the stem, respectively.

MARTIN NIELSON.